United States Patent [19]
Miyazaki et al.

[11] Patent Number: 6,094,247
[45] Date of Patent: *Jul. 25, 2000

[54] COLOR FILTER SUBSTRATE WITH LIGHT-SCREENING MEMBERS ARRANGED ON THE RESIN LAYER PATTERNS AND PRODUCTION METHOD THEREOF

[75] Inventors: Takeshi Miyazaki, Ebina; Keiichi Murai; Hiroshi Sato, both of Yokohama; Katsuhiro Shirota, Kawasaki; Akio Kashiwazaki, Yokohama; Shoji Shiba, Sagamihara, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/847,518

[22] Filed: Apr. 22, 1997

Related U.S. Application Data

[63] Continuation of application No. 08/589,457, Jan. 22, 1996, abandoned.

[30] Foreign Application Priority Data

Jan. 25, 1995 [JP] Japan ..................................... 7-009773
Mar. 30, 1995 [JP] Japan ..................................... 7-073330

[51] Int. Cl.⁷ .............................. G02F 1/335; G02F 1/333
[52] U.S. Cl. ............................. 349/110; 349/106; 359/891
[58] Field of Search ..................................... 349/110, 106; 359/885, 891; 427/492; 428/195; 430/7

[56] References Cited

U.S. PATENT DOCUMENTS

| | | | |
|---|---|---|---|
| 5,495,354 | 2/1996 | Jo | 349/110 |
| 5,552,192 | 9/1996 | Kashiwazaki et al. | 427/492 |
| 5,593,757 | 1/1997 | Kashiwazaki et al. | 428/195 |

FOREIGN PATENT DOCUMENTS

| | | |
|---|---|---|
| 61-245106 | 10/1986 | Japan . |
| 63-66501 | 3/1988 | Japan . |
| 04123006 | 4/1992 | Japan . |
| 05232313 | 9/1993 | Japan . |
| 5-241012 | 9/1993 | Japan . |

*Primary Examiner*—William L. Sikes
*Assistant Examiner*—Julie Ngo
*Attorney, Agent, or Firm*—Fitzpatrick, Cella, Harper & Scinto

[57] ABSTRACT

Disclosed herein is a color filter comprising a transparent base on which a plurality of coloring members different in spectral characteristics from each other, and light-screening members are selectively arranged, wherein the light-screening member are arranged on a resin layer patterns provided on the base, and the coloring members are arranged in between the resin layer patterns.

38 Claims, 4 Drawing Sheets

COLOR FILTER SUBSTRATE WITH LIGHT-SCREENING MEMBERS ARRANGED ON THE RESIN LAYER PATTERNS AND PRODUCTION METHOD THEREOF

This application is a continuation of application Ser. No. 08/589,457, filed Jan. 22, 1996, now abandoned.

BACKGROUND OF THE INVENTION

1. Field of the Invention

The present invention relates to a color filter, a production process thereof and a liquid crystal display device equipped with the color filter.

2. Related Background Art

In recent years, the research and development of liquid crystal display devices as flat display panels have gone on expanding, and the markets of the liquid crystal display devices are being enlarged on a great scale.

Components making up a liquid crystal display device are roughly divided into polarizing plates, glass bases, orientation films, a liquid crystal material, spacers, a color filter and the like. Of these, the color filter is said to become a key point for permitting the provision of liquid crystal display devices at reasonable cost because it is relatively high in cost.

The color filter for liquid crystal display device is constructed by arranging a plurality of coloring members different in spectral characteristics from each other, generally, coloring members of red (R), green (G) and blue (B) colors on a transparent base. The coloring members function as pixels.

In order to enhance display contrast, light-screening members are provided between the pixels. These light-screening members are called black matrices because they are generally of a black color.

The black matrices are usually formed by subjecting a deposited film or sputtered film of metallic chromium to an etching treatment. Processes for forming the coloring members which make up the pixels include a process of dyeing a dyeable medium which has been formed using a photolithographic technique, a process of using a pigment-dispersed photosensitive composition, and an electrodeposition process making good use of a patterned electrode. Besides, as a forming process low in cost, there is a process making use of an ink-jet system.

The process of producing a color filter using the ink-jet system can reduce the production cost compared with the conventional processes of producing a color filter. However, the cost is not yet reduced to a fully satisfactory extent under the circumstances.

For example, Japanese Patent Application Laid-Open No. 4-123006 discloses a production process of a color filter, wherein a photosensitive resin layer and a silicone rubber layer are laminated on a transparent base, on which black matrices have been formed, other portions of the photosensitive resin layer and the silicone rubber layer than the areas, on which the black matrices have been formed, are removed using a photolithographic process, and coloring members are then arranged on the thus-exposed areas using an ink-jet system.

Japanese Patent Application Laid-Open No. 5-232313 discloses a production process of a color filter, which comprises the steps of first laminating a photosensitive resin layer and a silicone rubber layer on a transparent base, selectively removing the photosensitive resin layer and the silicone rubber layer using a photolithographic process to coat the exposed areas with light-screening members and then with an additional silicone rubber layer, removing other portions of the photosensitive resin layer and the silicone rubber layer than the areas on which the light-screening members have been provided, and then arranging coloring members on the thus-exposed areas using an ink-jet system.

The production processes of a color filter disclosed in the above publications involve problems to be solved. More specifically, the following two points must be solved.

Namely, (i) since the photolithographic process is used, a developing step is necessary subsequently to exposure, and so the process becomes complicated. Taking the cost of liquid crystal display devices at present into consideration, it is necessary to simplify a production plant and production steps to reduce production cost. (ii) Since the silicone rubber layer is laminated, a protective layer or the like cannot be applied thereon. When the protective layer or the like is applied, it is necessary to remove the silicone rubber layer. This removal step takes a relatively long time and must be improved for reduction of the cost. On the other hand, if no protective layer is applied, the insecurity of durability and stability in the resulting color filter may be caused in some cases.

SUMMARY OF THE INVENTION

It is an object of the present invention to provide a production process of a color filter, which can solve the above technical problems to be solved and permits lessening of steps to reduce its production cost.

Another object of the present invention is to provide a color filter free of color mixing, color irregularities and blank areas.

A further object of the present invention is to provide a liquid crystal display device which can stably display excellent images.

The above objects can be achieved by the present invention described below.

According to the present invention, there is thus provided a color filter comprising a transparent base on which a plurality of coloring members different in spectral characteristics from each other, and light-screening members are selectively arranged, wherein the light-screening member are arranged on a resin layer provided on the base, and the coloring members are arranged on or in the resin layer.

According to the present invention, there is also provided a process for producing a color filter comprising a transparent base on which a plurality of coloring members different in spectral characteristics from each other, and light-screening members are selectively arranged, which comprises the steps of:

providing a resin layer, which is settable by a setting treatment, on the base;

selectively subjecting the resin layer to the setting treatment, thereby selectively forming set areas in the resin layer;

arranging the light-screening members on the set areas; and arranging the coloring members on unset areas of the resin layer.

According to the present invention, there is further provided a liquid crystal display device comprising a first substrate in which the color filter described above is provided, a second substrate in which pixel electrodes are arranged, and a liquid crystal material enclosed in a space between both substrate.

According to the color filter, the production process of the color filter and the liquid crystal display device equipped with the color filter of the present invention, the above technical problems can be solved.

More specifically, the production process of the color filter according to the present invention permits the production of the color filter through fewer steps. Therefore, the production cost can be reduced, and yield can be improved. The color filter according to the present invention can be provided as a filter free of color mixing, color irregularities and blank areas. The liquid crystal display device equipped with such a color filter can stably display excellent images.

DESCRIPTION OF THE PREFERRED EMBODIMENTS

The preferred embodiments of the present invention will hereinafter be described in detail by reference to the drawings.

Figure 1:
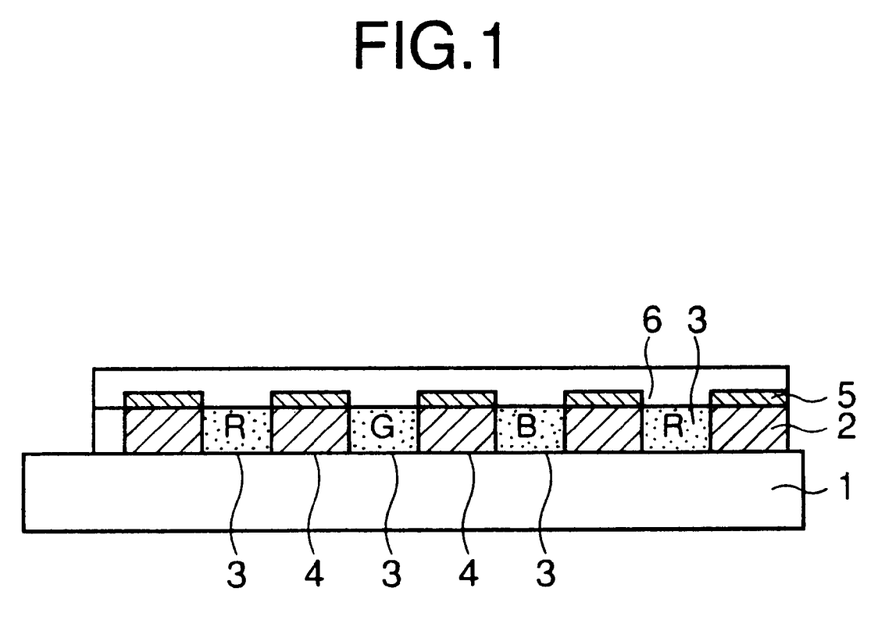
FIG. 1 typically illustrates a color filter according to an embodiment of the present invention.

FIG. 1 typically illustrates a color filter according to an embodiment of the present invention. In FIG. 1, reference numerals 1, 2, 3, 4 and 5 designate a transparent base, a resin layer, a plurality of coloring members different in spectral characteristics from each other, set areas, and light-screening members (black matrices), respectively. Reference numeral 6 indicates a protective layer which is optionally provided. A transparent conductive film such as ITO (indium tin oxide) may be formed as an electrode on the color filter to use the resultant composite member as a color filter substrate. At this time, the transparent conductive film may be provided either on the protective layer or without providing any protective layer.

A production process of a color filter according to an embodiment of the present invention will now be described by reference to FIGS. 2A to 2D, and FIGS. 3A and 3B. A feature of the production process of a color filter according to the present invention is that a developing step after exposure to the resin layer is unnecessary, and so the production steps can be simplified to reduce the production cost of the color filter, and yield is improved.

Figure 2A:
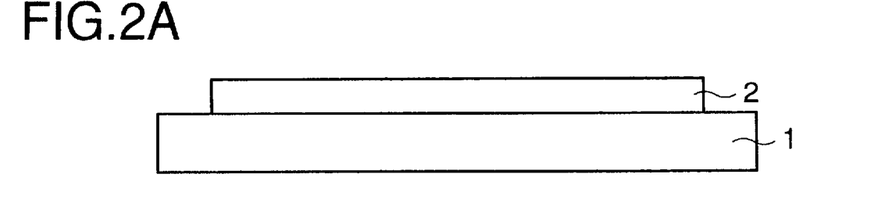
FIGS. 2A through 2D typically illustrate steps applicable to a production process of a color filter according to the present invention.
Figure 2B:
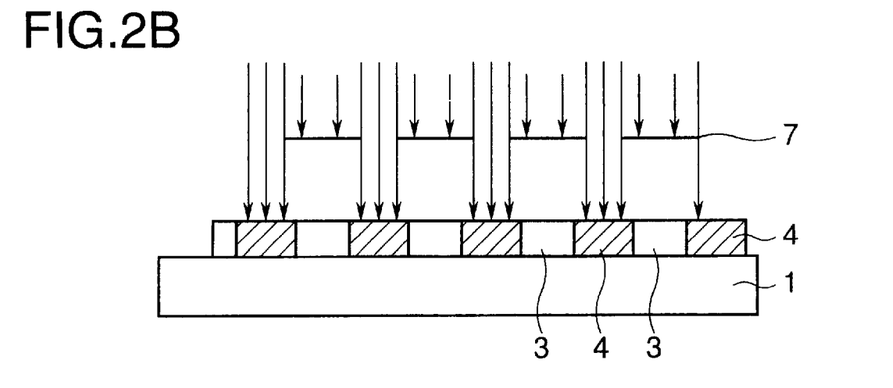

A resin layer 2, which is settable by a setting treatment, is first provided on a transparent base 1 (FIG. 2A). The resin layer 2 is selectively subjected to a setting treatment to selectively set areas 4, on which the light-screening member 5 will be provided, in the resin layer 2 (FIG. 2B). In the instance illustrated in FIG. 2B, light is irradiated through a photomask 7 to form the set areas 4 by the exposure. In this instance, it is desirable that the exposed areas be heated after the exposure (PEB, post-exposure baking) to facilitate the setting.

Figure 2C:
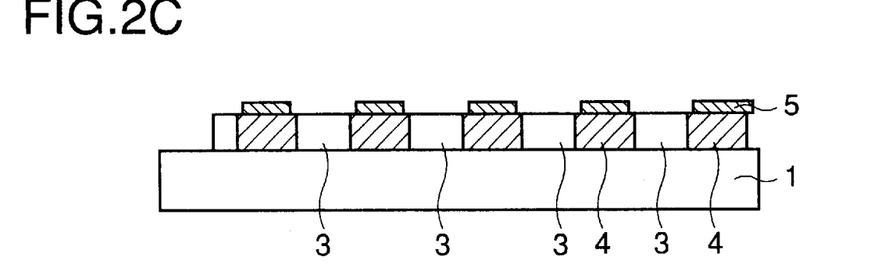
Figure 2D:
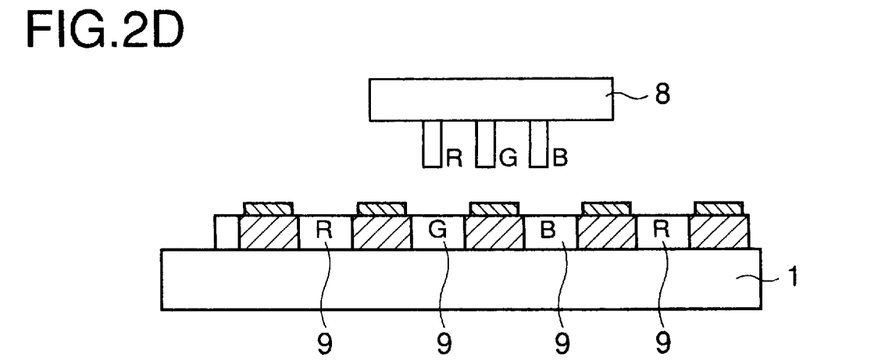

Light-screening members 5 are then arranged on the set areas 4 (FIG. 2C). A plurality of coloring members 9 [for example, red (R), green (G) and blue (B) inks], which are different in spectral characteristics from each other, is arranged on unset areas 3 of the resin layer 2 (FIG. 2D). In the instance illustrated in FIG. 2D, the colored areas are formed using an ink-jet recording apparatus 8. In this instance, the individual coloring members partially penetrate into the unset areas of the resin layer, and the remainder remains on the surfaces of the unset areas. In this specification, the coloring members penetrated into the unset areas of the resin layer and the coloring members present on the surfaces of the unset areas are collectively referred to as the "coloring members on the unset areas".

Figure 3A:
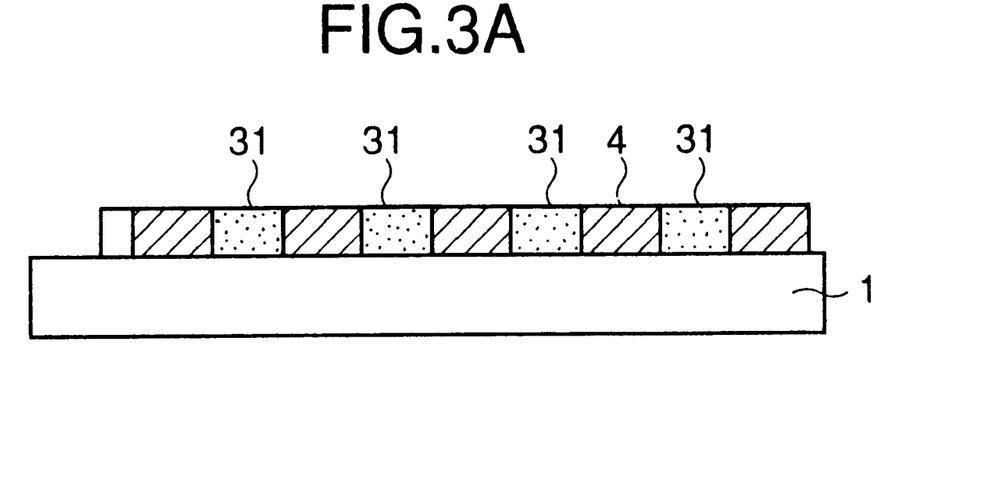
FIGS. 3A and 3B typically illustrate other steps applicable to the production process of a color filter according to the present invention.
Figure 3B:
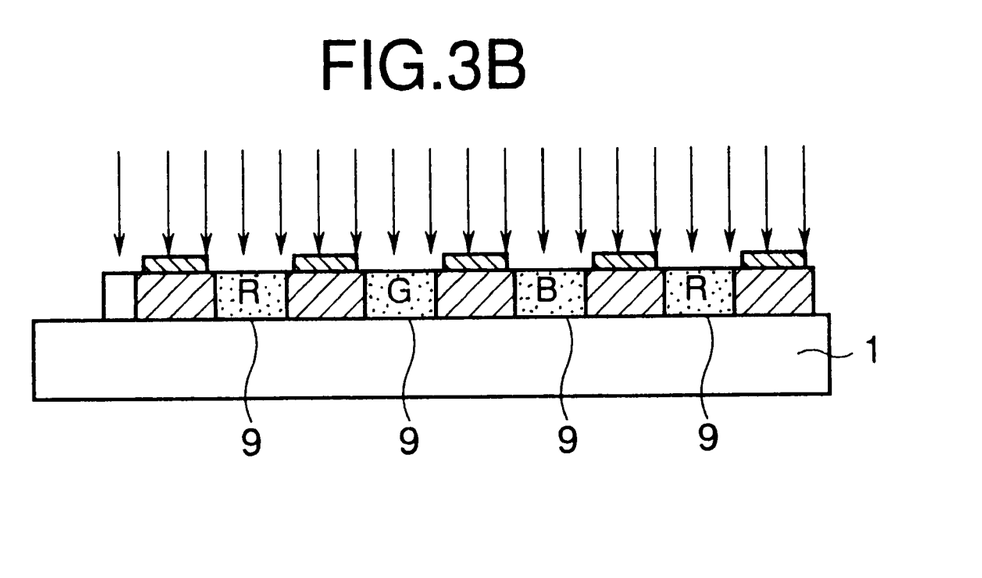

When the color filter is produced through such steps, the production cost can be reduced because a developing step after the exposure to the resin layer can be omitted. Referring now to FIGS. 3A and 3B, additional steps applicable to the process illustrated in FIGS. 2A to 2D will be described. The step illustrated in FIG. 3A is a step which may be conducted subsequently to the step illustrated in FIG. 2B. In this step, water is applied to the unset areas 3 of the resin layer to form water-containing unset areas 31.

When an oil-based ink material is used for the light-screening members 5, the compatibility of the water-containing unset areas 31 with the oil-based ink material becomes poor, and so the adhesion (staining) of the light-screening members 5 on the unset areas is prevented. It is therefore useful to apply water to the unset areas 3. The same effect can also be attained, instead of the application of water, by previously arranging coloring materials composed respectively of water-based inks on the unset areas 3, and then transferring the oil-based ink material for the light-screening members 5 to the set areas 4.

The step illustrated in FIG. 3B is a step which may be conducted subsequently to the step illustrated in FIG. 2D. In this step, the unset areas are set after the arrangement of the coloring members 9 on the unset areas of the resin layer. In this instance, light is irradiated to set the unset areas.

As the transparent base used in the present invention, a glass base is generally used. However, another base such as a plastic base may also be used so far as it has properties required of the color filter for liquid crystal display device, such as transparency and mechanical strength.

As a material for forming the resin layer, which can be used in the present invention, any material may be used so far as it can be selectively subjected to a setting treatment. The setting treatment can be usually performed by light irradiation, but may also be conducted by heating. Specific examples of photosensitive resins include acrylic resins, epoxy resins, silicone resins, cellulose derivatives such as hydroxypropylcellulose, hydroxyethylcellulose, methylcellulose and carboxymethylcellulose or modified products thereof, etc.

As a photo-induced initiator serving to cause a crosslinking reaction to progress by applying light or light and heat to these resins, there may be used a bichromate, bisazide compound, free-radical initiator, cationic initiator, anionic initiator or the like. It is also possible to use these photo-induced initiators in combination with each other, or with other sensitizing agents. Further, a photo-induced acid generator such as an onium salt may also be used in combination with a crosslinking agent.

As the photosensitive resin, a resin having such properties that its wettability by water-based color ink is deteriorated at its portions (set areas) subjected to a crosslinking reaction, and its ink absorptivity is hence lowered, while the wettability remains excellent at its unreacted portions (unset areas), and the ink absorptivity also remains good, may preferably be used.

A material for forming the light-screening members may be suitably selected from materials which can intercept light. Taking the ease of the forming step into consideration, however, it is desirable to use an ink material. The color of the ink may preferably be black. With respect to the ink material, it is desirable to use an oil-based ink in view of the problem of adhesion (staining) as described above.

As a coating process of the oil-based ink material, roll coating, spin coating, dip coating or the like may be used.

In the application of the oil-based ink material, the application or adsorption of water on the unexposed areas of the resin layer in advance permits the formation of a brighter pattern of the light-screening members with a sharp edge.

Specifically, a usual printing ink material may be used as the oil-based ink material. If a black ink is used, any of inorganic and organic pigments such as carbon black, titanium black and iron black may be used as a black coloring material. When the light-screening members are formed using a transfer process, a lithographic ink among printing inks may preferably be used.

In this instance, it is preferred that the viscosity of the ink is relatively high. An ink having a viscosity ranging from 100 to 1,000 poises may preferably be used.

In order to form the light-screening members using the spin coating or dip coating process, an ink having a relatively low viscosity, specifically, a viscosity ranging from 5 to 1,000 centipoises may preferably be used.

Upon the setting of the ink material, any system such as oxidative polymerization, gelation and evaporation drying, thermal polymerization or UV polymerization may be used. In particular, taking workability into consideration, it is desirable to adopt an ink in which a mixture of an oligomer containing a photo- or thermo-polymerizable vinyl group (for example, acryloyl or methacryloyl group) and a photo- or thermo-induced polymerization initiator is used as a vehicle.

In order to prevent color mixing upon the arrangement of the coloring members which make up pixels, it is desirable to add a water-repellent substance, for example, a silicon compound or fluorine compound, to the oil-based black ink.

In the present invention, it is desirable to use an ink-jet system for the formation of the coloring members which make up pixels.

Examples of the ink-jet system include systems by thermal energy and systems by mechanical energy, and any system may be suitably used. As materials for inks to be used, those usable in the ink-jet system may be suitable used. Coloring materials for the inks are suitably selected from various dyes and pigments according to transmission spectra required of, for example, individual pixels of R, G and B colors. Color inks used as the coloring members, which make up individual pixels, are not limited to inks which are liquid at ordinary temperature. Even inks solidified at room temperature or lower may be used so far as they soften or are liquid at room temperature, or turn liquid at the time recording signals to be used are applied. When the oil-based ink material is used for the light-screening members, it is preferable to use water-based ink materials, which are incompatible with the oil-based ink material, for the coloring members making up the pixels. In this instance, the use of water, alcohol, glycerol and/or the like as solvents for ink can make the color inks aqueous.

Figure 4:
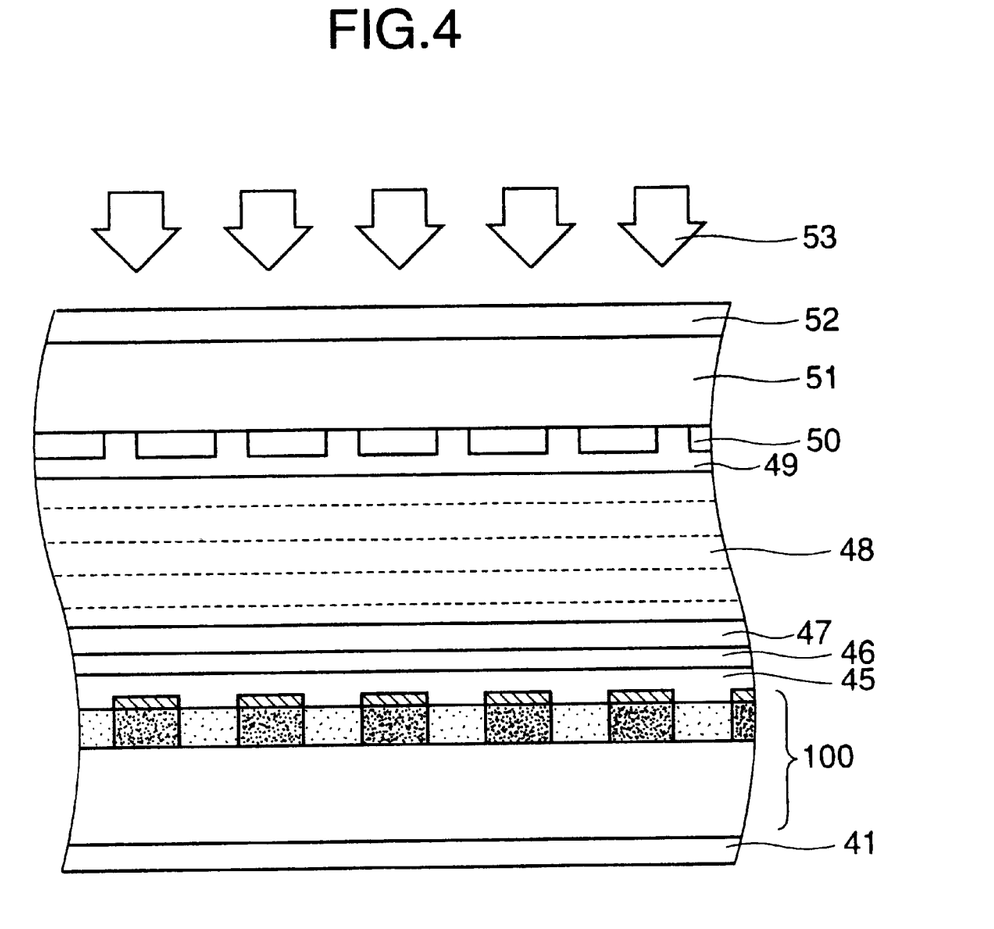
FIG. 4 is a typical cross-sectional view of a liquid crystal display device according to an embodiment of the present invention.

A color liquid crystal display device equipped with the color filter according to the present invention will now be described by reference to FIG. 4. FIG. 4 typically illustrates the color liquid crystal display device according to an embodiment of the present invention. In FIG. 4, reference numeral 100 indicates the color filter according to the present invention. A protective film 45, a common electrode 46 and an orientation film 47 are laminated on the color filter 100 to construct a first substrate. Reference numeral 51 designate a transparent base. Pixel electrodes 50 and an orientation film 49 are arranged on the base 51 to construct a second substrate. A liquid crystal material 48 is enclosed in a space between both substrate. Reference numerals 41 and 52, and 53 indicate polarizing plates and back light, respectively.

In the liquid crystal display device illustrated in FIG. 4, the pixel electrodes 50 are formed in a matrix form on the base opposite to the color filter 100 through the liquid crystal material 48. The coloring members of, for example, R, G and B colors, which make up the color filter, are arranged at positions opposite to the pixel electrodes 50.

The present invention will hereinafter be described more specifically by the following Examples. However, the present invention is not limited to or by these examples.

EXAMPLE 1

A photosensitive resin composition comprising an acrylic terpolymer having the following composition was applied onto a surface-polished non-alkali glass sheet (200 mm square by 1.1 mm thick), thereby forming a resin layer.

More specifically, the photosensitive resin composition was applied by a spin coater and then prebaked at 90° C. for 20 minutes, thereby forming a photosensitive resin layer having a film thickness of 2 μm.

Photosensitive resin composition:
Terpolymer composed of:

5.0 parts by weight of methyl methacrylate;
3.0 parts by weight of hydroxyethyl methacrylate;
2.0 parts by weight of N-methylolacrylamide
Triphenylsulfonium          0.3 part by weight
hexafluoroantimonate
Ethyl cellosolve            89.7 parts by weight.

The photosensitive resin layer was partially subjected to patterning exposure through a photomask having openings at portions corresponding to areas of the resin layer on which black matrices were to be formed, and then subjected to a heat treatment for 1 minute on a hot plate of 120° C., thereby partially conducting a setting treatment on the resin layer.

After water was applied by a spin coater onto the partially set photosensitive resin layer, a UV-curable oil-based black ink, "Daicure RT-7" (trade name, product of Dainippon Ink & Chemicals, Incorporated), was transferred to the base by roll coating to form a pattern of black matrices 1.5 μm thick.

Color inks of R, G and B colors, which had been prepared in accordance with their corresponding compositions shown in Table 1 were ejected from an ink-jet head, thereby arranging them in apertures defined by the black matrices.

TABLE 1

Compositions of color inks

Red ink

| | |
|---|---|
| Red dye[1] | 4.5 parts by weight |
| Ethylene glycol | 20 parts by weight |
| Isopropyl alcohol | 5 parts by weight |

TABLE 1-continued

Compositions of color inks

| | |
|---|---|
| Water | 70.5 parts by weight |
| Green ink | |
| Green dye[2] | 4.1 parts by weight |
| Ethylene glycol | 20 parts by weight |
| Isopropyl alcohol | 5 parts by weight |
| Water | 70.9 parts by weight |
| Blue ink | |
| Blue dye[3] | 5 parts by weight |
| Ethylene glycol | 20 parts by weight |
| Isopropyl alcohol | 5 parts by weight |
| Water | 70 parts by weight |

[1])A 11:3 mixture of C.I. Acid Red 35 and C.I. Acid Yellow 23.
[2])A 7:2 mixture of C.I. Acid Blue 9 and C.I. Acid Yellow 23.
[3])A 9:1 mixture of C.I. Acid Blue 9 and C.I. Acid Red 35.

After formation of ink dots, the colored resin layer was prebaked at a temperature of 90° C. for 20 minutes and then subjected to whole-surface exposure, followed by full baking at 230° C. for 30 minutes.

A thermosetting resin ("Hicoat LC2001", trade name, product of Sanyo Chemical Industries, Ltd.) was applied as a transparent protective film by a spin coater onto the colored resin layer, on which the pattern of the R, G and B colors had been formed in the above-described manner, so as to give a dry coating thickness of 0.5 μm. The thus-formed film was prebaked at 120° C. for 30 minutes and then fully baked at 200° C. for 30 minutes to form a protective layer.

The color filter thus produced was used to fabricate a liquid crystal display device.

Thin-film transistors and pixel electrodes were first formed on a glass base in such a manner that they were arranged correspondingly to the pattern of R, G and B colors making up the pixels of the color filter, and a polyimide orientation film was then provided, thereby producing the so-called active matrix substrate. Thereafter, ITO as a transparent conductive film and a polyimide orientation film were formed on the color filter to produce a substrate opposite to the active matrix substrate.

The active matrix substrate and the opposite substrate were bonded to each other through a sealant. A twist nematic (TN) liquid crystal was enclosed in a space between both substrates. Thereafter, polarizing plates were separately arranged on the outer sides of both substrates between which the liquid crystal had been enclosed, and a cold-cathode flat fluorescent lamp was arranged on the side of the active matrix substrate, thereby fabricating a liquid crystal display device.

Television signals of the NTSC system were inputted into the liquid crystal display device thus fabricated to display images. As a result, excellent images were able to be stably displayed.

Although the image display was conducted for a long period of time, troubles caused by color mixing, color irregularities and/or blank areas were not observed.

EXAMPLE 2

Black matrices were formed in the same manner as in Example 1 except that an oil-based black ink obtained by dissolving 5 parts by weight of C.I. Solvent Black 3 in 95 parts by weight of toluene was used as an oil-based black ink. The formation of coloring members of R, G and B colors was conducted in the same manner as in Example 1 except that full baking was performed at 200° C. for 30 minutes, and a color filter was produced without using any protective film. The color filter thus produced was used to fabricate a liquid crystal display device in the same manner as in Example 1. Television signals of the NTSC system were inputted into the thus-obtained liquid crystal display device to display images. As a result, excellent images were able to be stably displayed.

Although the image display was conducted for a long period of time, troubles caused by color mixing, color irregularities and/or blank areas were not observed.

EXAMPLE 3

The following photosensitive resin composition comprising an acrylic tetrapolymer composed of acrylic acid, methyl methacrylate, hydroxyethyl methacrylate and N-methylolacrylamide was applied by a spin coater onto the same glass sheet as that used in Example 1 and then prebaked at 90° C. for 20 minutes, thereby forming a photosensitive resin layer having a film thickness of 2 μm.
Photosensitive resin composition:
Tetrapolymer composed of:

| | |
|---|---|
| 0.3 part by weight of acrylic acid; | |
| 5.0 parts by weight of methyl methacrylate; | |
| 2.7 parts by weight of hydroxyethyl methacrylate; | |
| 2.0 parts by weight of N-methylolacrylamide, | |
| Triphenylsulfonium triflate | 0.2 part by weight |
| Ethyl cellosolve | 89.8 parts by weight. |

The photosensitive resin layer was partially subjected to patterning exposure through a photomask having openings at portions corresponding to areas of the resin layer on which black matrices were to be formed, and then subjected to a heat treatment for 1 minute on a hot plate of 120° C., thereby partially conducting a setting treatment on the resin layer.

Color inks of R, G and B colors, which had been prepared in accordance with their corresponding compositions shown in Table 1 were ejected from an ink-jet head, thereby arranging their dots on unset areas of the resin layer.

An ink obtained by dispersing 5% by weight of polytetrafluoroethylene (PTFE, particle diameter: about 1 μm) in "Daicure RT-7" (trade name, product of Dainippon Ink & Chemicals, Incorporated) was used as a black ink for forming black matrices to transfer it to the base by roll coating before the ink dots were dried (while water was present), thereby forming a pattern of black matrices 1.5 μm thick to produce a color filter.

A liquid crystal display device was fabricated in the same manner as in Example 1. Television signals of the NTSC system were inputted into the thus-obtained liquid crystal display device to display images. As a result, excellent images were able to be stably displayed.

Although the image display was conducted for a long period of time, troubles caused by color mixing, color irregularities and/or blank areas were not observed.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A color filter comprising a transparent base on which a plurality of coloring members different in spectral characteristics from each other, and light-screening members are selectively arranged, wherein the light-screening members are arranged on the surfaces of the resin layer patterns having portions high in an ink-absorptivity and portions low in an ink-absorptivity provided on the base, and the coloring members are arranged in the portions high in an ink-absorptivity.

2. The color filter according to claim 1, wherein the resin layer patterns are formed with a photosensitive resin.

3. The color filter according to claim 1, wherein the coloring members are formed with ink materials.

4. The color filter according to claim 3, wherein the ink materials are aqueous.

5. The color filter according to claim 1, wherein the light-screening members are formed with an ink material.

6. The color filter according to claim 5, wherein the ink material is oily.

7. The color filter according to claim 5, wherein the color of the ink material is black.

8. A liquid crystal display device comprising a first substrate in which the color filter according to any of claims 1 to 7 or is provided, a second substrate in which pixel electrodes are arranged, and a liquid crystal material enclosed in a space between both substrate.

9. The color filter according to claim 1, wherein the coloring members are arranged in the resin layer.

10. A process for producing a color filter comprising a transparent base on which a plurality of coloring members different in spectral characteristics from each other, and light-screening members are selectively arranged, which comprises the steps of:

providing a resin layer, which is settable by a setting treatment, on the base;

selectively subjecting the resin layer to the setting treatment, thereby selectively forming the resin layer patterns having portions high in an ink-absorptivity and portions low in an ink-absorptivity on said base;

arranging the light-screening members on the surfaces of said resin layer patterns; and arranging the coloring members in the portions high in an ink-absorptivity.

11. The process according to claim 10, wherein the setting treatment is performed by light irradiation.

12. The process according to claim 10, wherein the coloring members are formed with ink materials.

13. The process according to claim 10, wherein the ink materials are aqueous.

14. The process according to claim 10, wherein the step of arranging the coloring members is conducted using an ink-jet system.

15. The process according to claim 10, wherein the light-screening members are formed with an ink material.

16. The process according to claim 15, wherein the ink material is oily.

17. The process according to claim 15, wherein the color of the ink material is black.

18. The process according to claim 15, wherein the light-screening members are arranged using a transfer process.

19. The process according to claim 18, wherein the ink material has a viscosity ranging from 100 to 1,000 poises.

20. The process according to claim 15, wherein the light-screening members are arranged using a spin coating or dip coating process.

21. The process according to claim 20, wherein the ink material has a viscosity ranging from 5 to 1,000 centipoises.

22. The process according to claim 10, wherein water is applied in advance to the portions high in an ink-absorptivity prior to the step of arranging the light-screening members.

23. The process according to claim 10, wherein the step of arranging the coloring members in the portions high in an ink-absorptivity is conducted prior to the step of arranging the light-screening members.

24. The process according claim 10, wherein the coloring members are arranged in the resin layer which is not subjected to the setting treatment.

25. A process for producing a liquid crystal display device comprising the steps of:

providing, on a base, a resin layer which is settable by a setting treatment;

selectively subjecting the resin layer to the setting treatment, thereby selectively forming resin layer paterns having portions high in an ink-absorptivity and portions low in an ink-absorptivity on said base;

arranging light-screening members on the surfaces of the resin layer patterns;

arranging coloring members in the portions high in an ink absorptivity, thereby forming a color filter substrate;

providing a substrate having pixel electrodes opposite to the color filter substrate; and enclosing a liquid crystal material in a space between both substrates.

26. The process according to claim 25, wherein the setting treatment is performed by light irradiation.

27. The process according to claim 25, wherein the coloring members are formed with ink materials.

28. The process according to claim 27, wherein ink materials are aqueous.

29. The process according to claim 25, wherein the setup of arranging the coloring members is conducted using an ink-jet system.

30. The process according to claim 25, wherein the light-screening members are formed with an ink material.

31. The process according to claim 30, wherein the ink material is oily.

32. The process according to claim 30, wherein the color of the ink material is black.

33. The process according to claim 30, wherein the light-screening members are arranged using a transfer process.

34. The process according to claim 33, wherein the ink material has a viscosity ranging from 100 to 1,000 poises.

35. The process according to claim 30, wherein the light-screening members are arranged using a spin coating or dip coating process.

36. The process according to claim 35, wherein the ink material has a viscosity ranging from 5 to 1,000 centipoises.

37. The process according to claim 25, wherein water is applied to the portions high in an ink-absorptivity prior to the step of arranging the light-screening members.

38. The process according to claim 25, wherein the step of arranging the coloring members on the portions high in an ink-absorptivity is conducted prior to the step of arranging the light-screening members.

* * * * *

UNITED STATES PATENT AND TRADEMARK OFFICE
CERTIFICATE OF CORRECTION

PATENT NO. : 6,094,247　　　　　　　　　　　　　　　　　　Page 1 of 2
DATED : July 25, 2000
INVENTOR(S) : Takeshi Miyazaki et al.

It is certified that error appears in the above-identified patent and that said Letters Patent is hereby corrected as shown below:

Title page,
Item [56], FOREIGN PATENT DOCUMENTS,
"04123006" should read -- 4-123006 --;
"05232313" should read -- 5-232313 --.
Item [57], ABSTRACT, line 5, "member" should read -- members --, and "a" should be deleted.

Column 1,
Line 25, "high" should read -- low --.

Column 2,
Line 43, "member" should read -- members --;
Line 67, "substrate." should read -- substrates. --.

Column 5,
Line 48, "suitable" should read -- suitably --.

Column 6,
Line 7, "designate" should read -- designates --;
Line 10, "substrate." should read -- substrates. --.

Column 7,
Line 43, "twist" should read -- twisted --.

Column 8,
Line 62, "to" (second occurrence) should be deleted.

Column 9,
Line 22, "or" should read -- or 9 --;
Line 24, "substrate." should read -- substrates. --;
Line 46, "claim 10," should read -- claim 12, --.

UNITED STATES PATENT AND TRADEMARK OFFICE
CERTIFICATE OF CORRECTION

PATENT NO. : 6,094,247
DATED : July 25, 2000
INVENTOR(S) : Takeshi Miyazaki et al.

It is certified that error appears in the above-identified patent and that said Letters Patent is hereby corrected as shown below:

Column 10,
Line 20, "paterns" should read -- patterns --;
Line 24, "ink" should read -- ink --.

Signed and Sealed this

Thirtieth Day of April, 2002

Attest:

JAMES E. ROGAN
*Attesting Officer*       *Director of the United States Patent and Trademark Office*